United States Patent
Hayashi et al.

(10) Patent No.: US 7,898,739 B2
(45) Date of Patent: Mar. 1, 2011

(54) PLASTIC OPTICAL ELEMENT, NEST STRUCTURE, DIE, OPTICAL SCAN APPARATUS AND IMAGE FORMATION APPARATUS

(75) Inventors: Eiichi Hayashi, Atsugi (JP); Kan Aoki, Yamato (JP); Akihiro Iwamatsu, Ebina (JP); Go Takahashi, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 237 days.

(21) Appl. No.: 12/196,662

(22) Filed: Aug. 22, 2008

(65) Prior Publication Data
US 2009/0073580 A1 Mar. 19, 2009

(30) Foreign Application Priority Data
Sep. 14, 2007 (JP) ............... 2007-239924

(51) Int. Cl.
*G02B 3/00* (2006.01)
(52) U.S. Cl. .............. 359/662; 359/668; 359/808
(58) Field of Classification Search ......... 359/642–892; 264/1.1–2.7; 425/175–180
See application file for complete search history.

(56) References Cited

U.S. PATENT DOCUMENTS

| | | | |
|---|---|---|---|
| 6,015,514 A | 1/2000 | Koseko | |
| 6,144,505 A * | 11/2000 | Nakanishi et al. | 359/811 |
| 6,919,120 B2 | 7/2005 | Yamanaka et al. | |
| 6,995,919 B2 * | 2/2006 | Kim | 359/662 |
| 2006/0262372 A1 | 11/2006 | Hayashi | |
| 2007/0216983 A1 | 9/2007 | Hayashi et al. | |
| 2008/0049287 A1 | 2/2008 | Kimura et al. | |

FOREIGN PATENT DOCUMENTS

| | | |
|---|---|---|
| JP | 2001-219447 | 8/2001 |
| JP | 2002-337178 | 11/2002 |
| JP | 3512595 | 1/2004 |
| JP | 3696420 | 7/2005 |
| JP | 2006-168285 | 6/2006 |
| JP | 4108195 | 4/2008 |

* cited by examiner

*Primary Examiner*—Darryl J Collins
(74) *Attorney, Agent, or Firm*—Oblon, Spivak, McClelland, Maier & Neustadt, L.L.P.

(57) ABSTRACT

A plastic optical element is provided, which includes an optical element body having a transfer surface which includes at least one laser beam incident portion of a concave shape, and a support portion connected with the optical element body, in which the support portion is disposed in a direction of a tangent line at an end of the transfer surface, and the optical element body and a part of the support portion are molded in the same nest structure.

11 Claims, 6 Drawing Sheets

PLASTIC OPTICAL ELEMENT, NEST STRUCTURE, DIE, OPTICAL SCAN APPARATUS AND IMAGE FORMATION APPARATUS

CROSS-REFERENCE TO RELATED APPLICATIONS

The present application is based on and claims priority from Japanese Patent Application No. 2007-239924, filed on Sep. 14, 2007, the disclosure of which is hereby incorporated by reference in its entirety.

BACKGROUND OF THE INVENTION

1. Field of the Invention

The present invention relates to a plastic optical element used in an optical imaging system such as a laser digital copier, a laser printer, or a facsimile machine as well as an optical device such as a video camera. In particular, it relates to a plastic optical element made of a molded plastic article such as a plastic scan lens with a precise mirror face and a large, uneven thickness, and it relates to a nest structure for use in molding such plastic optical element, a die, an optical scan apparatus including the plastic optical element, and an image formation apparatus including the optical scan apparatus.

2. Description of Related Art

Heretofore, optical elements (lens, mirror) with laser beam imaging and correction functions have been commonly used in optical units of an optical imaging system such as a laser digital copier, a printer, a facsimile machine. In recent years, adoption of aspherical surfaces for the optical elements has improved their optical performance, and the optical elements have become moldable in complex shape by injection molding or injection compression molding. As a result, manufacture costs therefor have been in decrease. Generally, in order to precisely mold them in a desired shape by plastic molding including the above-mentioned injection molding or injection compression molding, it is preferable that in cooing solidification process of molten resin in a cavity of a die, pressure and temperature of the molten resin inside the cavity, that is, temperature distribution in the die has to be uniform.

When uneven resin temperature or local temperature distribution occurs in the die, or thermal contraction varies in the die, resulting in external defects such as sink marks in the molded plastic article. Increasing the amount of molten resin to fill in the cavity of the die by increasing injection pressure can be effective to solve the external defects. However, this may cause another problem of inner distortion of the molded plastic article, especially at a portion in thin thickness, adversely affecting the optical performance thereof.

Moreover, in molding an optical element in long length and uneven thickness, occurrence of sink marks will increase because the cooling speed, or thermal contraction of resin varies depending on a position of the optical element due to the unevenness in lens thickness, and temperature distribution need be uniform in the die in the longitudinal direction.

In molding such long, unevenly shaped optical element with the conventional nest structure which is composed of different members for an optical element body and a support portion connected with the optical element body, sink marks typically occur in a joint surface between the different members due to air flow into the joint surface when filling molten resin into the cavity of the die by injection. The air inflow locally decreases the temperature or adherence of the die, resulting in local thermal contraction, in other words, the sink marks in the molded plastic article as well as another external defect as air bubbles.

Japanese Patent No. 4108195 (Reference 1) discloses a high-precision molding method for molding long, unevenly shaped plastic optical element without remnant inner pressure of resin and inner distortion at as low manufacture cost as that for a thin molded plastic article by providing an incomplete transfer part in concave or convex shape on a surface other than a transfer surface.

Japanese Patent Nos. 3696420 (Reference 2) and 3512595 (Reference 3) disclose a concrete method for forming a concavity on a part of the surface other than the transfer surface of the plastic optical element. The method comprises the steps of preparing a pair of dies each with at least one or more cavities formed by cavity pieces and transfer surfaces, the cavity pieces forming surfaces including a non-transfer surface and having at least one or more vent holes and at least one or more communication ports in communication with the vent holes to supply compressed gas to an article and connected with a compressed gas supply device outside the die; heating the die at a temperature less than a softening temperature of resin and maintaining the temperature, filling molten resin heated at over the softening temperature in the cavities by injection; creating resin pressure on the transfer surface to get the resin in close contact with the transfer surface; supplying compressed gas to the resin in the cavities via the vent holes when the resin is cooled down below the softening temperature; and enforcedly defining voids between the cavity pieces with the vent holes and the resin to thereby form a non-transfer surface (also, disclosed in Japanese Laid-open Patent Application Publication No. 2002-337178).

However, there is a drawback in the above-mentioned method that for molding the plastic optical element using the conventional nest structure which is composed of different members for the optical element body and the support portion, the occurrence of sink marks increases compared with using a general molding method. The sink marks occur when compressed gas is supplied to the resin in the cavities due to the air flow into the joint surfaces between the members which causes local decrease in temperature or adherence of the die and results in local thermal contraction, or the sink marks. The air flow also causes the air bubbles.

When the plastic optical element is an fθ lens or the like used in the current optical scan apparatus, it is especially required to reduce the external optical defects while maintaining the optical performance of the lens body and all or part of the support portion, since a part of the support portion is integrally formed with the lens body having the transfer surface and used for having a laser beam pass therethrough for determining scan start timing.

In order to solve the above problem, Japanese Laid-open Patent Application Publication No. 2006-168285 discloses a technique to integrally form a nest structure for the optical element body and the support portion connected therewith. However, there still remains a problem in this technique that the optical element body cannot be easily released from the nest structure. In other words, it is not possible to continuously mold the plastic optical element in main scan direction which should be smoothly molded compared with sub scan direction. The plastic optical element cannot be molded in the same nest structure.

SUMMARY OF THE INVENTION

In view of solving the above problem, an object of the present invention is to provide a plastic optical element with improved mass productivity and less optically harmful external defects which can maintain the optical performance thereof at the current level, as well as to provide an optical scan apparatus including such plastic optical element, and an image formation apparatus incorporating such optical scan apparatus.

According to one aspect of the present invention, a plastic optical element is configured to include an optical element body comprising a transfer surface which includes at least one laser beam incident portion of a concave shape; and a support portion connected with the optical element body, in which the support portion is disposed in a direction of a tangent line at an end of the transfer surface; and the optical element body and a part of the support portion are molded in a same nest structure.

Preferably, in the plastic optical element the laser beam incident portion and the support portion are molded in a same nest structure.

Preferably, in the plastic optical element the support portion includes a rib.

Preferably, in the plastic optical element the nest structure includes a concave portion at its end, and the rib is formed by the concave portion of the nest structure.

Preferably, in the plastic optical element the transfer surface including the laser beam incident portion has a rib.

Preferably, in the plastic optical element the rib of the transfer surface extends to the support portion.

Preferably, in the plastic optical element, the laser beam incident portion and the part of the support portion are formed with a same level of precision.

Preferably, in the plastic optical element, the optical element body and the support portion are molded from a transparent resin material.

Preferably, in the plastic optical element, the optical element body and the support portion is molded from a transparent resin material and constitute an fθ lens.

According to another aspect of the invention, a nest structure is configured to integrally mold a plastic optical element which comprises an optical element body comprising a transfer surface which includes at least one laser beam incident portion of a concave shape, and a support portion disposed in a direction of a tangent line at an end of the transfer surface.

According to another aspect of the present invention, a die comprising such a nest structure is provided.

According to another aspect of the present invention, an optical scan apparatus comprises an optical imaging system comprising the above-mentioned plastic optical element, a light source emitting a laser beam, and an optical deflector deflecting the light beam emitted from the light source to scan a scan area.

According to another aspect of the present invention, an image formation apparatus comprises the above optical scan apparatus and an image formation unit.

DETAILED DESCRIPTION OF THE PREFERRED EMBODIMENT

Hereinafter, the embodiments of the present invention will be described with the accompanying drawings. In each embodiment, components with the same function and the same form will be given the same numeric codes for the sake of simplicity, and detailed description thereon may be omitted. Also, the drawings may omit showing some components which require no specific description.

First Embodiment

Figure 1:
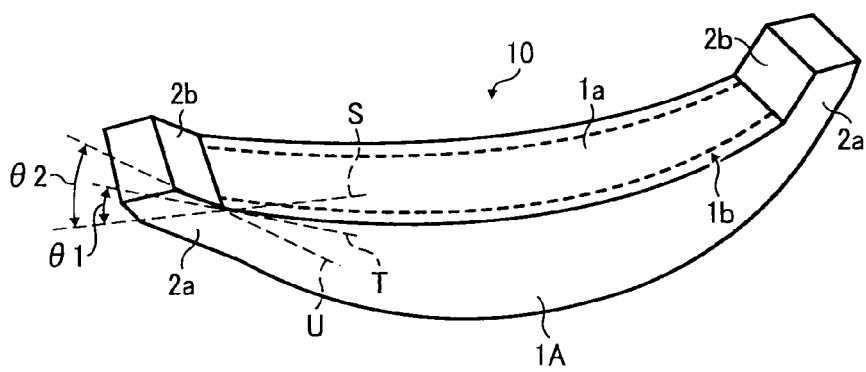
FIG. 1 is a schematic perspective view of a plastic optical element (fθ lens) according to the first embodiment.
Figure 2:
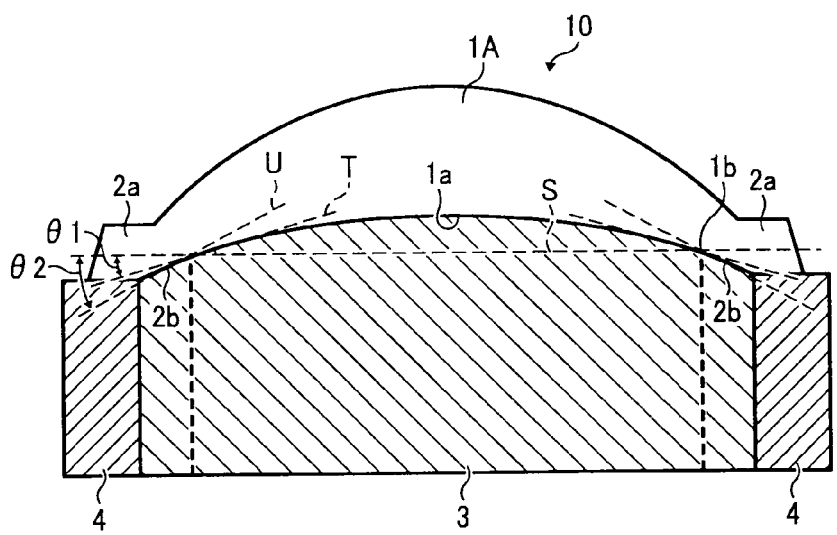
FIG. 2 is a cross sectional view of the plastic optical element (fθ lens) and a nest structure according to the first embodiment.

The first embodiment of the present invention will be described with reference to FIGS. 1, 2. FIG. 1 is a schematic perspective view of a plastic optical element according to the first embodiment. FIG. 2 is a vertical cross sectional view of an essential part of the plastic optical element molded in the nest structure of a die. Structure and operation of a plastic optical element 10 will be described using as an example an fθ lens as a component of an optical scan apparatus incorporated in a color laser beam printer.

The plastic optical element as an fθ lens comprises an optical element body 1A comprising a transfer surface 1b which includes at least one laser beam incident portion 1a of a concave shape and support portions 2a integrally formed with the optical element body at right and left ends thereof in the drawings. The plastic optical element 10 (11 to 14) has symmetric shapes relative to a central line so that only one part thereof will be described with reference to FIGS. 1 to 9 unless otherwise stated.

The transfer surface 1b including the laser beam incident portion 1a functions to gather light while the support portion 2a functions to have a laser beam not used for image formation but for synchronous detection pass therethrough. In a later-described optical scan apparatus, a laser beam as a synchronous signal passes through the support portion 2a for determining scan start timing.

Note that the plastic optical element 10 and those 11 to 14 in FIGS. 4, 6, 8, and 9 are integrally molded by a similar method to the above method disclosed in the Reference 3 except for nest structures 3, 4, 8 for molding them.

As shown in the drawings, the plastic optical element 10 according to the present embodiment includes the right and left support portions 2a which are each disposed in a direction U which makes an angle θ2 with a main scan direction S, and in a tangent line direction T at ends of the transfer surface 1b of the optical element body 1A which makes an angle θ1 with the main scan direction S. The laser beam incident portion 1a and a part 2b of the support portion 2a are integrally molded in the same nest structure 3. In FIG. 2, a nest structure 4 molds a part of the support portion 2a excluding the part 2b.

According to the present embodiment, disposing the support portions 2a in the plastic optical element 10 in such a manner makes it possible to mold the laser beam incident portion 1a and the part 2b of the support portion 2a in the integrated nest structure 3 in such a shape to be easily released therefrom.

As described above, in the plastic optical element 10 as the fθ lens, the optical element body 1A comprising a transfer surface 1b which includes the laser beam incident portion 1a of a concave shape and the parts 2b of support portions 2a connected with the optical element body can be continuously formed in the main scan direction S. That is, the laser beam incident portion 1a and the parts 2b of the support portions 2a can be molded in the single integrated nest structure 3. Therefore, in filling molten resin in a not-shown cavity of a die, the air inflow in the joint surface of the die does not occur, preventing the local temperature or adhesion decrease in the die. This results in reducing the local thermal shrinkage or sink marks and air bubbles in the plastic optical element as external defects. According to the present embodiment, it is possible to provide the plastic optical element 10 with improved mass productivity and less optically harmful external defects which can maintain the optical performance thereof at the current level.

A larger advantageous effect is attainable at a gate side from which the molten resin is poured into the die cavity and the air inflow is most likely to occur. Furthermore, disposing the support portions 2a at the ends of the transfer surface 1b in the tangent line direction T makes it possible to make smaller the outer form of the parts 2b of the support portion 2a or design it to be in smaller thickness in a light transmit direction. This allows the parts 2b to be used to have a laser beam pass through as a synchronous signal so as to determine the optical scan start timing in a later-described optical scan apparatus, as that in the prior art.

Second Embodiment

Figure 3:
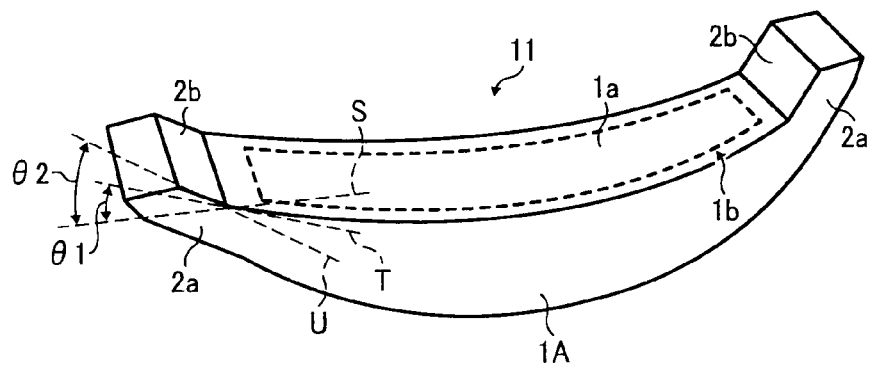
FIG. 3 is a schematic perspective view of a plastic optical element (fθ lens) according to the second embodiment.
Figure 4:
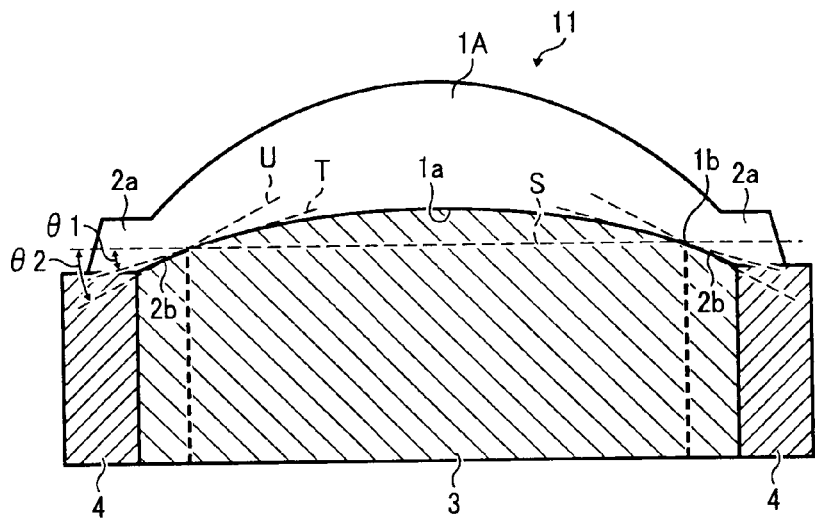
FIG. 4 is a cross sectional view of the plastic optical element (fθ lens) and a nest structure according to the second embodiment.

The second embodiment of the present invention will be described with reference to FIGS. 3, 4. FIG. 3 is a schematic perspective view of a plastic optical element according to the second embodiment. FIG. 4 is a cross sectional view of an essential part of the plastic optical element molded in the nest structure of a die. Structure and operation of a plastic optical element 11 will be described using as an example an fθ lens as a component of a later-described optical scan apparatus, as in the first embodiment.

The plastic optical element 11 according to the present embodiment is the same as that 10 in the first embodiment except that the optical element body 1A and the parts 2b of the support portions 2a are integrally molded in the same nest structure 3 in replace of the laser beam incident portion 1a and the parts 2b of the support portions 2a.

The plastic optical element 11 according to the present embodiment includes the support portions 2a which are each placed in a direction U which makes an angle θ2 with the main scan direction S, and in a tangent line direction T at ends of the transfer surface 1b of the optical element body 1A which makes an angle θ1 with the main scan direction S. Disposing the support portions 2a in plastic optical element 11 in such a manner makes it possible to mold the optical element body 1A and the part 2b of the support portion 2a in the integrated nest structure 3 in such a shape to be easily released therefrom.

According to the present embodiment, therefore, the same advantageous effects as those in the first embodiment are achievable.

Third Embodiment

Figure 5:
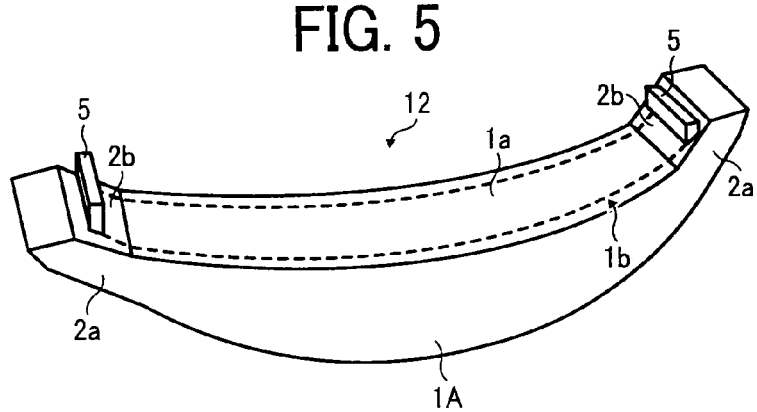
FIG. 5 is a schematic perspective view of a plastic optical element (fθ lens) according to the third embodiment.
Figure 6:
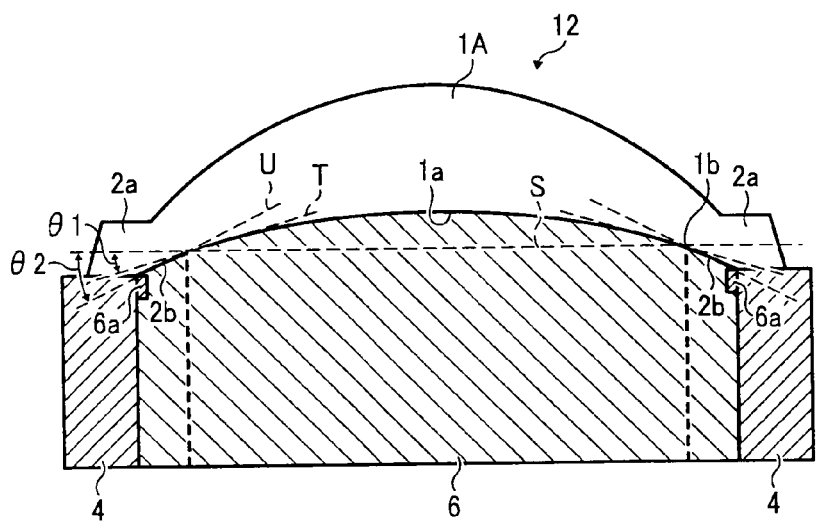
FIG. 6 is a cross sectional view of the plastic optical element (fθ lens) and a nest structure according to the third embodiment.

The third embodiment of the present invention will be described with reference to FIGS. 5, 6. FIG. 5 is a schematic perspective view of a plastic optical element according to the third embodiment. FIG. 4 is a cross sectional view of an essential part of the plastic optical element molded in the nest structure of a die. Structure and operation of a plastic optical element 12 will be described using as an example an fθ lens as a component of a later-described optical scan apparatus, as in the first embodiment.

The plastic optical element 12 according to the present embodiment is the same as that 10 in the first embodiment except that the right and left support portions 2a each include a rib 5 and that a nest structure 6 provided with concavities 6a for molding the ribs 5 is used in replace of the nest structure 3.

The feature of the plastic optical element 12 lies in that the laser beam incident portion 1a, the parts 2b of the support portions 2a, and the ribs 5 are molded in the integrated nest structure 6 with the concavities 6a.

In the present embodiment, the plastic optical element 12 includes the support portions 2a which are each placed in a direction U which makes an angle θ2 with the main scan direction S, and in a tangent line direction T at ends of the transfer surface 1b of the optical element body 1A which makes an angle θ1 with the main scan direction S. Also, it includes the rib 5 formed in a vertical direction by the concavity 6a of the nest structure 6. This makes it possible to mold the laser beam incident portion 1a, the parts 2b of the support portions 2a and the ribs 5 in the integrated nest structure 6 in such a shape to be easily released therefrom.

According to the present embodiment, providing each support portion 2a with the rib 5 and forming the rib 5 by the concavity 6a at the end of the nest structure 6 makes it possible to further reduce the air flow into the joint surfaces of the die and reduce the sink marks and air bubbles as the external defects in the plastic optical element.

Fourth Embodiment

Figure 7:
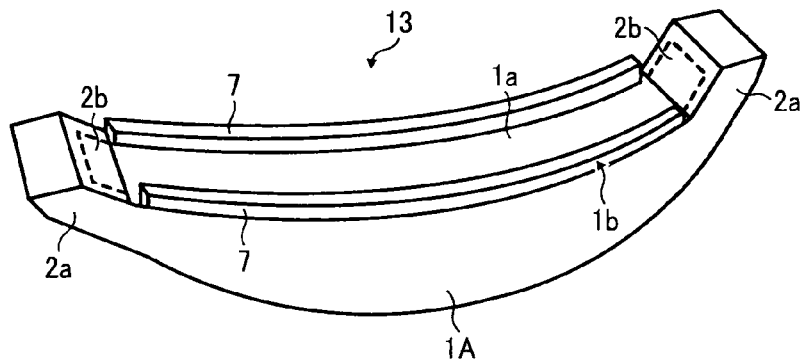
FIG. 7 is a schematic perspective view of a plastic optical element (fθ lens) according to the forth embodiment.
Figure 8:
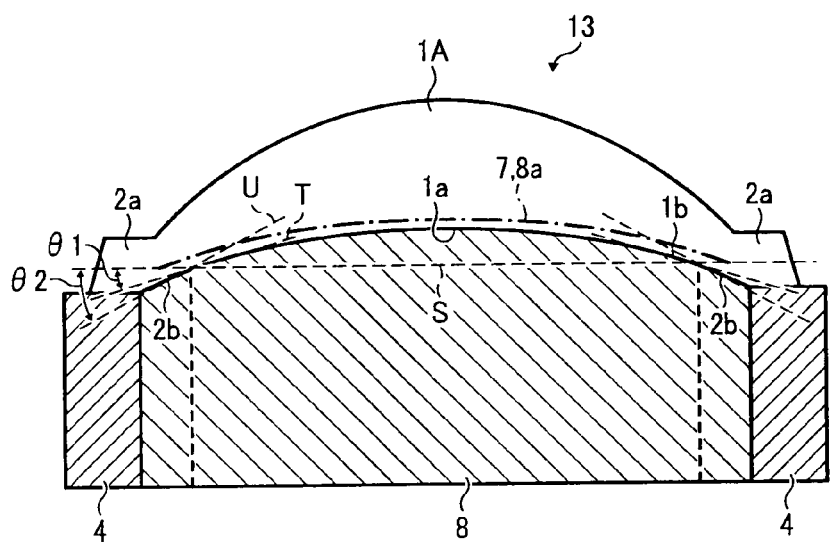
FIG. 8 is a cross sectional view of the plastic optical element (fθ lens) and a nest structure according to the forth embodiment.

The fourth embodiment of the present invention will be described with reference to FIGS. 7, 8. FIG. 7 is a schematic perspective view of a plastic optical element according to the fourth embodiment. FIG. 8 is a cross sectional view of an essential part of the plastic optical element molded in the nest structure of a die. Structure and operation of a plastic optical element 13 will be described using as an example an fθ lens as a component of a later-described optical scan apparatus, as in the first embodiment.

The plastic optical element 13 according to the present embodiment is the same as that 10 in the first embodiment except that the optical element body includes narrow belt-like ribs 7 in areas on both sides of the transfer surface 1b in width direction and also in areas on both sides of the support portions 2a in width direction. Further, in the present embodiment a nest structure 8 provided with concavities 8a used for molding the ribs 7 is used in replace of the nest structure 3, and the other structure thereof is the same as that in the first embodiment.

The feature of the plastic optical element 13 lies in that the laser beam incident portion 1a, the parts 2b of the support portion 2a, and the ribs 7 are molded in the integrated nest structure 8 with the concavities 8a.

In the present embodiment, the plastic optical element 13 includes the support portions 2a which are each placed in a direction U which makes an angle θ2 with the main scan direction S, and in a tangent line direction T at ends of the transfer surface 1b of the optical element body 1A which makes an angle θ1 with the main scan direction S. Also, it includes the ribs 7 in a vertical direction by the concavities 8a of the nest structure 8. This makes it possible to mold the laser beam incident portion 1a, the parts 2b of the support portions 2a and the ribs 7 in the integrated nest structure 8 in such a shape to be easily released therefrom.

According to the present embodiment, providing the transfer surface 1b on both sides of the width direction with the narrow belt-like ribs 7 extending to the support portions 2a, and forming the ribs 7 by the concavities 8a in the nest structure 8 makes it possible to further reduce the air inflow from sides of the nest structure which are the portions where the air inflow is most likely to occur, and to thereby reduce the sink marks and air bubbles as the external defects.

In addition, it is possible to generate the sink marks and air bubbles in the ribs 7 so that the fθ lens in long length and uneven thickness as the plastic optical element 13 can be molded without remnant resin inner pressure or internal distortion with precision and at a manufacturing cost equivalent to that of a plastic optical element in thin thickness.

Fifth Embodiment

Figure 9:
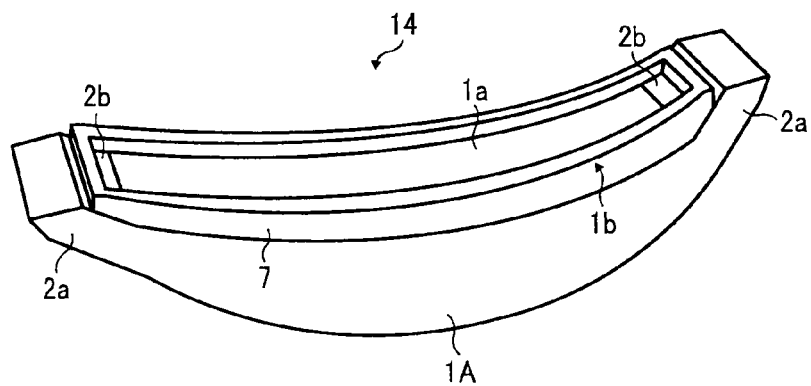
FIG. 9 is a schematic perspective view of a modified example of the plastic optical element (fθ lens) according to the forth embodiment.

The modified example of the fourth embodiment will be described with reference to FIG. 9. FIG. 9 is a schematic perspective view of a modified example of the plastic optical element 13 according to the fourth embodiment. Structure and operation of a plastic optical element 14 will be described using as an example an fθ lens as a component of a later-described optical scan apparatus, as in the fourth embodiment.

The modified plastic optical element 14 according to the present embodiment is the same as that 13 in the fourth embodiment except that the narrow belt-like ribs 7 extend to surround the entire outer circumference of the support portions 2a and that a not-shown nest structure provided with not-shown concavities for molding the ribs 7 is used in replace of the nest structure 8. The ribs 7 are formed to include the parts 2b of the support portions 2a, or the area of the parts 2b indicated by the broken lines in FIG. 7 and formed by the not-shown nest structure.

According to this modified example, extending the ribs 7 from the transfer surface 1b to the support portions 2a makes it possible to further increase the advantageous effects of the fourth embodiment.

Furthermore, in the plastic optical elements 10 to 14 according to the first and fifth embodiments, forming the laser beam incident portion 1a and the parts 2b of the support portions 2a at the same level of precision makes it possible to increase the adhesion between the resin and the nest structure and further reduce the sink marks as the external defects.

For molding the plastic optical elements 10 to 14 according to the first and fifth embodiments which are required to have transparency, the resin used therefor can be amorphous resin whose softening temperature is glass transition temperature, such as polymetacrylate resin, polycarbonate resin, alicyclic acrylate resin, or circular polyolefin copolymer. For elements or components other than the optical element, crystalline resin whose softening temperature is melting temperature is usable.

Sixth Embodiment

Next, an optical scan apparatus incorporating any one of the plastic optical elements (fθ lens) 10 to 14 will be described by way of example with reference to FIGS. 10, 11. Hereinafter, the plastic optical elements 10 to 14 will be called fθ lens 10 to 14. The fθ lens 10 will represent the other lenses in the following description.

Aiming for setup in a smaller space, the optical scan apparatus according to the present embodiment comprises two laser units 26 as a light source emitting laser beams indicated by broken lines in the drawings, two cylindrical lenses 27 corresponding to the laser units 26, a single-stage optical deflector 21, a plurality (in this case, two) of fθ lens systems as optical imaging system including at least one fθ lens 10 (in this case, one), at least one (in this case, three) return mirrors 23 disposed on optical paths of the corresponding fθ lens systems, and a single support member supporting the respective optical elements. Each of the laser units 26 is composed of a semiconductor laser and a collimator lens.

Figure 10:
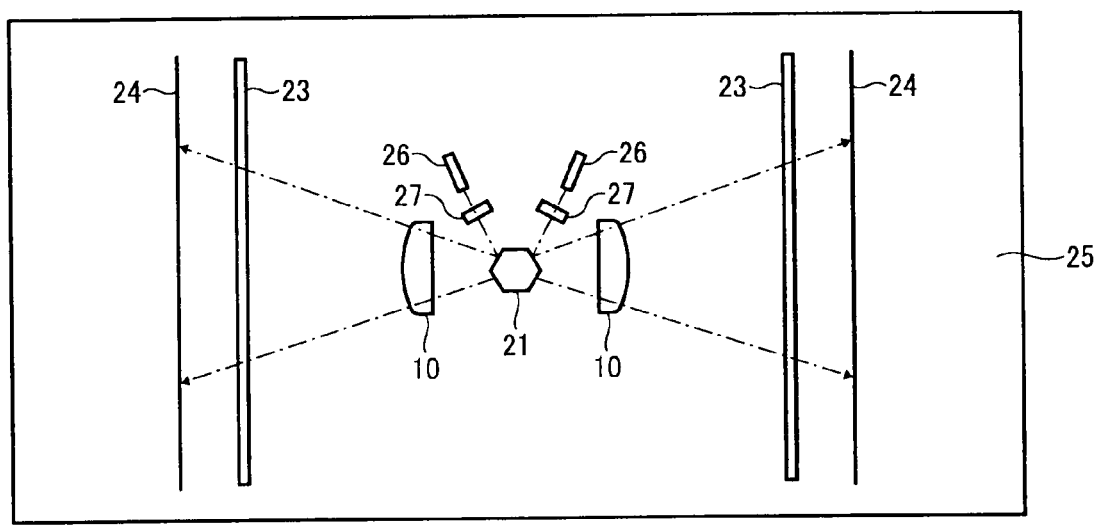
FIG. 10 is a schematic plain view of an optical scan apparatus incorporating the plastic optical element (fθ lens) according to the present invention.
Figure 11:
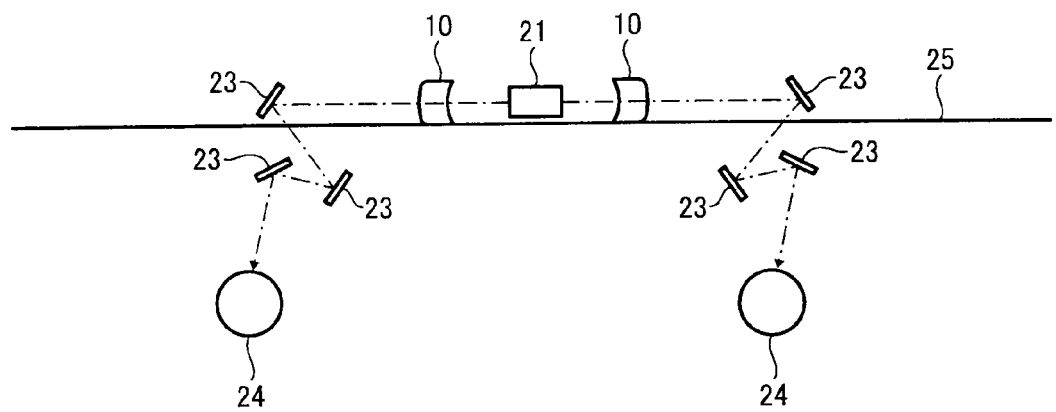
FIG. 11 is a schematic front view of the optical scan apparatus in FIG. 10.

In the optical scan apparatus in FIGS. 10, 11, the fθ lenses 10 constituting the fθ lens systems are disposed on the opposite sides from the optical deflector 21 so that laser beams deflected by the optical deflector 21 are to be substantially parallel to each other in the main scan direction. With the fθ lens 10, laser beams are adjusted so that their imaging positions are shifted in the same direction on scan surfaces of two photoconductors 24. Also, the fθ lenses 10 are molded in the same die cavity.

In a color image formation apparatus, a shift of an imaging position on each photoconductor 24 will be a color shift among the respective colors since the fθ lens systems correspond to combinations of photoconductors (in this case, combinations in two colors, yellow (Y) and magenta (M), cyan (C) and black (Bk), for example). In order to shift the imaging positions of the laser beams on the scan surfaces of two photoconductors 24 in the same direction, two conditions need to be satisfied. That is, the first condition is to optically design the fθ lenses so that the imaging positions are shifted in the same direction in the four photoconductors corresponding to four colors, and the second condition is to align a warpage direction of each fθ lens which may affect curvature of a scan line.

In view of satisfying the first condition, it is essential to optically design the fθ lens systems so that the return mirrors 23 are arranged in such a manner to equalize the number of vertical beam inversions by the return mirrors 23 in each fθ lens system. In other words, in the optical scan apparatus the fθ lens systems are each configured to include at least one return mirror 23, and the number of the return mirrors 23 returning transmitted laser beams from the fθ lenses 10 is to be the same for each fθ lens 10. As shown in FIG. 11, three return mirrors 23 are arranged for each of the right and left fθ lenses 10 in the present embodiment.

In view of satisfying the second condition, it is important to use the fθ lenses 10 which are molded in the same die cavity. The warpage of the fθ lenses 10 molded in the same die cavity is in almost the same shape or direction so that the curvature of the scan line due to the lens warpage can be reduced. The fθ lenses molded in the same die cavity refers to not only those molded in the same cavity of a multi-cavity die but also those molded in a single cavity die, for example.

Further, it is preferable for reducing the lens warpage to use lenses manufactured successively under the same condition, or in the same manufacture lot, in addition to the usage of the lenses molded in the same die cavity. The same manufacture condition includes at least the same materials and specification and the same molding condition. In case that the die has been polished for maintenance purpose or manufacture process has been changed, the lenses molded in the polished die or under the changed process are not to be considered ones molded in the same manufacture lot.

It is also preferable to distinguish the fθ lenses 10 molded in the same die cavity from those molded in a different die cavity for the purpose of not mixing them up, by externally marking the non-transfer surfaces of the fθ lenses 10 with die cavity numbers, concavities and convexities in different numbers and arrangements, or partial coloring, for example.

Next, the operation of the optical scan apparatus will be described. Laser beams from each laser unit 26 are incident and deflected by the optical deflector 21 via the cylindrical lenses 27. Then, having passed through the fθ lenses 10, the laser beams are reflected by the respective three return mirrors 23 in the right and left fθ lens systems in FIGS. 10, 11. The reflected laser beams reach and scan the scan surfaces of the photoconductors 24 in the main scan direction, forming spot-like images thereon, whereby electrostatic latent images are formed in sequence.

Accordingly, it is made possible to reduce the manufacture cost for the optical scan apparatus in FIGS. 10, 11 since it incorporates the fθ lenses 10 as the plastic optical element molded in the die having the above-mentioned nest structure. Further, without greatly improving the precision of the fθ lens 10, an optical scan apparatus having less shifts of imaging positions can be provided. This leads to achieving a color image formation apparatus with less color shift.

Seventh Embodiment

Next, structure of a color image formation apparatus 620 incorporating an optical scan apparatus 600 will be described with reference to FIGS. 12, 13. The color image formation apparatus 620 comprises an intermediate transfer belt 606 and four image formation stations with respective drum-type photoconductors 24Y, 24M, 24C, 24Bk arranged in parallel in a moving direction of the intermediate transfer belt 606. Note that the four photoconductors may be collectively referred to photoconductors 24 below for simplicity.

Yellow color toner images are formed in the image formation station with the photoconductor 24Y, magenta color toner images are formed in the image formation station with the photoconductor 24M, cyan color toner images are formed in the image formation station with the photoconductor 24C, and black color toner images are formed in the image formation station with the photoconductor 24Bk.

The four image formation stations have the same structure for toner image formation except for the colors of toners, therefore, only one of them for yellow toner image formation will be described representatively.

In the yellow toner image formation station, around the photoconductor 24Y disposed are an electric charger 602Y evenly charging the surface of the photoconductor 24Y, a develop roller 603 attaching charged toner to electrostatic latent images on the photoconductor 24Y formed by the optical scan apparatus 600 for visualization, a develop unit 604Y including a toner cartridge to supply yellow color toner to the develop roller 603Y, a not-shown primary transfer roller provided inside the intermediate transfer belt 606 to primarily transfer toner images on the photoconductor 24Y to the intermediate transfer belt 606, and a cleaning unit 605Y scraping off and accumulating remnant toner on the photoconductor 24Y after the transfer.

Latent images are formed concurrently in plural lines (in this case, four lines divided in two) on the photoconductors 24Y, 24M, 24C, 24Bk by scanning laser beams deflected by the optical deflector 21 (a polygon mirror) in opposite directions. The intermediate transfer belt 606 is supported by three rollers 606a, 606b, and 606c and rotates counterclockwise. The toner images in yellow, magenta, cyan, and black colors are transferred and superimposed sequentially at a timing onto the intermediate transfer belt 606 to thereby form color images. Sheets of paper 150 as a recording medium are fed by a paper feed roller 608 from a paper feed tray 607 one by one from the uppermost sheet, and delivered by a resist roller pair 609 to a transfer unit in accordance with a recording start timing in the sub scan direction (paper feed direction). The superimposed color images on the intermediate transfer belt 606 are collectively transferred onto a sheet of paper 150 by a secondary transfer roller 613 in the transfer unit. The sheet of paper 150 with the color image thereon is delivered to a fuser unit 610 which includes a fuser roller 610a and a pressure roller 610 and fuses the color image. The sheet of paper 150 after the fuse is discharged via a paper discharge roller pair 612 to a paper discharge tray 611 which is provided on the top surface of the apparatus body.

Figure 12:
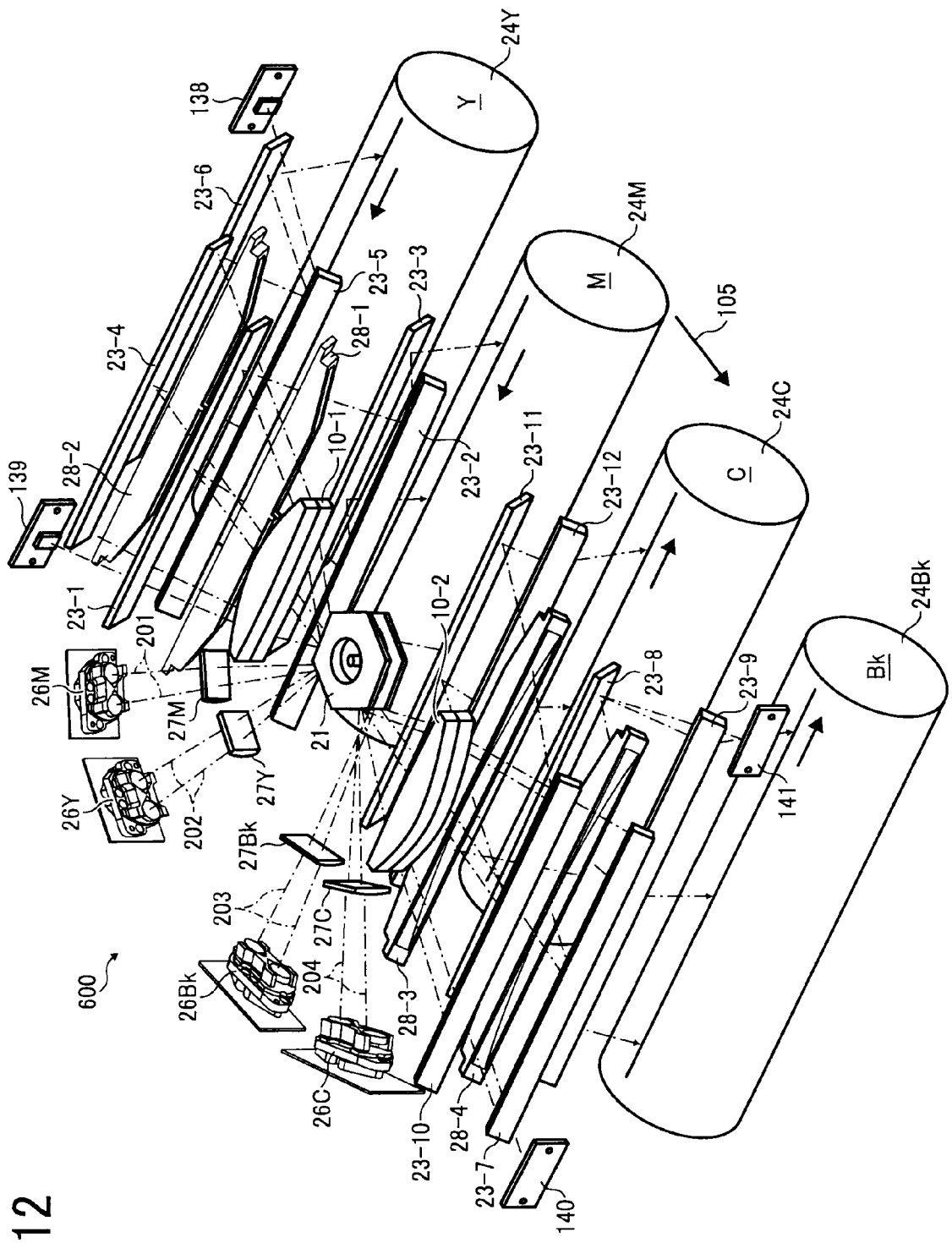
FIG. 12 is a perspective view of essential parts of a color image formation apparatus incorporating the optical scan apparatus with the plastic optical element (fθ lens) according to the present invention.

The optical scan apparatus 600 in FIG. 12 is of an opposite scanning type, including the optical deflector 21 as a polygon mirror to deflect the laser beams in opposite directions to scan the four stations on two sides in the main scan direction. The four photoconductors 24Y, 24M, 24C, 24Bk are arranged with equal interval in a moving direction of the intermediate transfer belt (not shown in FIG. 12 but shown in FIG. 13) to form color images by sequentially transferring toner images of different colors and superimposing them.

As shown in the drawing, the optical scan apparatus 600 is integrally structured to deflect laser beams by the single optical deflector 21 to scan the photoconductors 24Y, 24M, 24C, 24Bk. The optical deflector 21 deflects laser beams in opposite scan directions to form linear images so that a scan start position on one side matches a scan end position on the other side. The optical deflector 21 is a polygon mirror with six mirror faces and configured in two stages having the same axis in the present embodiment. The middle portion of the polygon mirror which is not used for deflection has a slightly smaller diameter than an inscribed circle of the polygon mirror to form a groove therein for reduction of windage loss. The thickness of a single layer of the optical deflector 21 is about 2 mm and the upper and lower stages thereof are the same in phase.

Laser units 26 each comprise a pair of semiconductor lasers for two-line simultaneous scanning which is done by scanning a scan area in the sub scan direction with a single line pitch shifting according to recording density. This allows the rotation speed of the optical deflector 21 to be a half of image recording speed. Laser beams 201 to 204 from the laser units 26M, 26Y, 26Bk, 26C are incident from opposite directions on a cross section of the optical deflector 21 in the sub direction including the rotation axis, and deflected in two directions for scanning.

An optical path from the laser units 26Y, 26M to the photoconductors 24Y, 24M will be described. A cylindrical lens 27Y is disposed in association with the laser unit 26Y and has a cylinder surface with a curvature only in the sub scan direction as the first surface and a flat surface on the second surface. In combination with a later-described toroidal lens, it functions as an optical face tangle error correction system to have the deflection surface of the optical deflector 21 and the outer surface of each photoconductor 24 conjugate with each other in the sub scan direction. The laser beams are thereby converged linearly on the deflection surface in the sub scan direction.

Cylindrical lenses 27M, 27C, 27Bk are disposed in association with the laser units 26M, 26C, 26Bk and have the same structure as that of the cylindrical lens 27Y. Each of the cylindrical lenses functions as an imaging device constituting an optical imaging system in the present embodiment.

Fθ lenses 10-1, 10-2 are molded from plastic resin and have aspherical surfaces at least in the main scan direction on the first and second surfaces, and laminated or integrally formed in two stages by bonding. The fθ lenses 10-1, 10-2 function as an imaging device constituting an optical imaging system to focus the laser beams 201 to 204 deflected by the optical deflector 21 onto the surfaces of the photoconductors 24. The fθ lenses 10-1, 10-2 are formed of a light transmissive plastic with light weight and available at low cost.

The laser beams 202 from the laser unit 26Y are incident and deflected on the lower stage of the optical deflector 21 via the cylindrical lens 27Y. Having passed through the lower stage of the fθ lens 10-1, the laser beams 202 are reflected by the return mirror 23-4 to turn downward diagonally and be incident on a toroidal lens 28-2. Then, it is reflected by the return mirrors 23-5, 23-6 to reach the scan surface of the photoconductor 24Y, forming a spot-like images and electrostatic latent images sequentially. Thereby, a first image formation station forms a yellow color image.

The laser unit 26M is disposed at a position radially shifted from the laser unit 26Y in the main scan direction, seen from the intersection of an extension line of the optical axis of the fθ lens 10-1 and the deflection surface of the optical deflector 21. The laser beams 201 are incident on the upper stage of the optical deflector 21 via the cylindrical lens 27M at a different incidence angle from that of the laser beams 202 from the laser unit 26Y.

The laser beams 201 deflected by the optical deflector 21 pass through the upper stage of the fθ lens 10-1, and reflected by the return mirror 23-1 to turn downward diagonally and be incident on a toroidal lens 28-1. Then, it is reflected by the return mirrors 23-2, 23-3 to reach the scan surface of the photoconductor 24M, forming spot-like images and electrostatic latent images sequentially. Thereby, a second image formation station forms a magenta color image.

The optical paths of laser beams form the laser units 26Bk, 26C to the photoconductors 24Bk, 24C are substantially symmetric to those from the laser units 26Y, 26M relative to the optical deflector 21; therefore, a description thereon will be omitted. Laser beams 203 from the laser unit Bk are guided to the scan surface of the photoconductor Bk to form a black color image in the fourth image formation station. Laser beams 204 from the laser unit 26C are guided to the scan surface of the photoconductor 24C to form a cyan color image in the third image formation station.

Toroidal lenses 28-1, 28-2, 28-3, 28-4 function as an imaging device constituting an optical imaging system to form an image on the scan surfaces of the photoconductors 24 with the laser beams 201 to 204 deflected by the optical deflector 201. They are molded from a light transmissive plastic with light weight and available at low cost.

According to the present embodiment, three return mirrors are arranged for each color image formation station so that optical path lengths from the deflection surface of the optical deflector 21 to illumination positions on the scan surfaces of the photoconductors are to be a predetermined value and that the laser beams 201 to 204 are to be incident on the photoconductors 24Y to 24Bk at the same position and at the same angle, respectively.

Also, the rotation angles of the photoconductors 24 are the same from the illumination positions to transfer positions (directly below) of the laser beams 201 to 204. The toroidal lenses 28-1 to 28-4 each have a coaxial, aspherical surface as the first surface and a toroidal surface as the second surface. As described above, the photoconductors 24Y to 24Bk form yellow, magenta, cyan, black color images as the first to fourth image formation stations, respectively.

In FIG. 12, the optical scan apparatus 600 comprises substrates 138, 140 and substrates 139, 141 at scan start and end positions of an image formation area, respectively. The substrates 138, 140 each have a photosensor mounted thereon for synchronous detection (hereinafter, referred to as synchronous detector substrate), while the substrates 139, 141 each have a photosensor mounted thereon for scan end detection (hereinafter, referred to as scan end detector substrate). The four detector substrates detect laser beams scanning the respective image formation stations and outputting detection signals.

In the present embodiment, a not-shown controller determines scan start timing according to the detection signals from the synchronous detector substrates 138, 140 and determines scan end timing according to the detection signals from the scan end detector substrates 139, 141. The controller obtains a difference in time between the detection signals to control the scan start timing to correct shifts of the imaging position in the main scan direction due to wavelength fluctuation or curvature variation of the fθ lenses 10-1, 10-2. The optical scan apparatus according to the present embodiment scans in two opposite directions so that the shifts of the imaging position cause the image formation areas to extend in opposite directions. In order to prevent this, it is configured to correct scan timing so that the centers of the respective images can be aligned.

Figure 13:
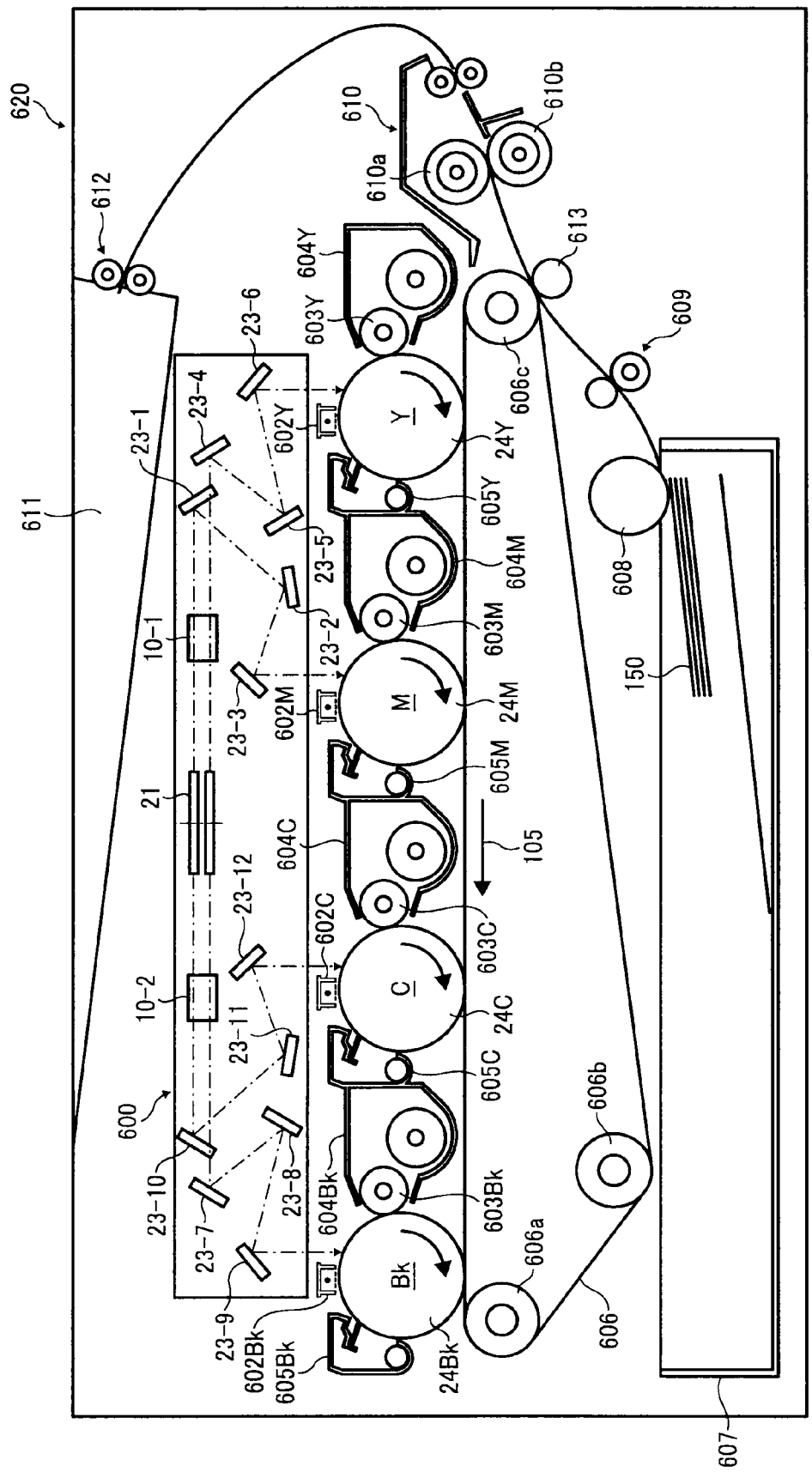
FIG. 13 shows the entire structure of the color image formation apparatus in FIG. 12.

Accordingly, it is possible to reduce the manufacture cost for the color image formation apparatus 620 in FIGS. 12 and 13 incorporating the optical scan apparatus 600 having the fθ lenses 10-1, 10-2 which are molded in the die including the above-mentioned nest structure.

The color image formation apparatus 620 in FIGS. 12, 13 is of a tandem type in which toner images are transferred onto the intermediate transfer body and then collectively transferred onto the recording medium as sheets of paper. However, the present invention is not limited thereto. It is also applicable to a tandem type color image formation apparatus of a direct transfer system in which toner images are transferred and superimposed in sequence while a recording medium as sheets of paper is delivered via a free end belt.

The present invention can solve the problems in the prior art and achieves provision of a novel plastic optical element, a nest structure, a die, an optical scan apparatus including the novel plastic optical element, and an image formation apparatus incorporating the optical scan apparatus.

According to the present invention, the plastic optical element is configured to include the optical element body comprising a transfer surface which includes at least one laser beam incident portion of a concave shape, and the support portion connected with the optical element body. With such a configuration, it is possible to continuously mold the plastic optical element in the main scan direction, or mold the laser beam incident portion and a part of the support portion or the optical element body and the part of the support portion in the same nest structure. This accordingly makes it possible to eliminate the air flow into the joint surfaces of the die in filling molten resin into the cavity die by injection, preventing local decrease in the temperature or adhesion of the die. This results in reducing the local thermal shrinkage, or sink marks and air bubbles as external defects. Advantageously, a larger effect is attainable at the gate side from which the molten resin is poured into the die cavity and the air inflow is most likely to occur. Furthermore, disposing the support portions at the ends of the transfer surface in the tangent line direction makes it possible to design the outer form of the support portion in a smaller size.

Furthermore, the present invention is applicable to a color image formation apparatus having a free belt type photoconductor with a scan surface and to an optical scan apparatus incorporated therein.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A plastic optical element comprising:
   an optical element body comprising a transfer surface which includes at least one laser beam incident portion of a concave shape; and
   plural support portions connected with opposite ends of the optical element body, wherein:
   each of the plural support portions is disposed in a direction of a respective tangent line at ends of the transfer surface; and
   the optical element body and parts of the plural support portions are molded in a same nest structure,
   wherein the optical element body and the support portions constitute an fθ lens.

2. A plastic optical element according to claim 1, wherein the laser beam incident portion and the support portion are molded in a same nest structure.

3. A plastic optical element according to claim 1, wherein each of the plural support portions includes a rib.

4. A plastic optical element according to claim 3, wherein: the nest structure includes a concave portion at its end; and the ribs are formed by the concave portion of the nest structure.

5. A plastic optical element according to claim 1, wherein the transfer surface including the laser beam incident portion has a rib.

6. A plastic optical element according to claim 5, wherein the rib of the transfer surface extends to the support portions.

7. A plastic optical element according to claim 1, wherein the laser beam incident portion and the parts of the support portions are formed with a same level of precision.

8. A plastic optical element according to claim 1, wherein the optical element body and the support portions are molded from a transparent resin material.

9. An optical scan apparatus comprising:
   an optical imaging system comprising a plastic optical element according to claim 1;
   a light source emitting a laser beam; and
   a optical deflector deflecting the light beam emitted from the light source to scan a scan area.

10. An image formation apparatus comprising:
    an optical scan apparatus according to claim 9; and
    an image formation unit.

11. The plastic optical element of claim 1, wherein the transfer surface includes ribs on both sides of the transfer surface extending from end-to-end in a longest dimension of the transfer surface, and ribs on both sides of the support portions that connect to the ribs on the sides of the transfer surface.

* * * * *